United States Patent

[11] 3,624,400

| [72] | Inventor | Barry George Cohen<br>P.O. Box 526, Elizabeth, N.J. 07207 |
|---|---|---|
| [21] | Appl. No. | 6,365 |
| [22] | Filed | Jan. 28, 1970 |
| [45] | Patented | Nov. 30, 1971 |

[54] APPARATUS FOR THE PRODUCTION OF HIGH-RESOLUTION VISIBLE IMAGES OF OBJECTS ILLUMINATED BY OR EMITTING INFRARED RADIATION
14 Claims, 2 Drawing Figs.

[52] U.S. Cl. .................................................. 250/83.3 HP,
250/83.3 H, 250/213 Vt
[51] Int. Cl. ........................................................ H01j 31/50
[50] Field of Search .......................................... 250/83.3 H,
83.3 HP, 213 VI; 350/1, 2

[56] References Cited
UNITED STATES PATENTS

| 2,946,255 | 7/1960 | Bolay | 250/83.3 HR X |
| 3,443,105 | 5/1969 | Scidmore et al. | 250/213 VT |
| 3,446,963 | 5/1969 | Kohashi et al. | 250/83.3 HP |
| 3,454,773 | 7/1969 | Bulthuis et al. | 250/83.3 HP X |

*Primary Examiner*—Archie R. Borchelt
*Assistant Examiner*—Davis L. Willis
*Attorney*—Frederick W. Padden

ABSTRACT: High-resolution visible images of objects illuminated by or emitting infrared radiation are obtained by a unique combination of objective lenses and an image-converter tube adapted so that the resolution is advantageously limited by the wavelength and diffraction effects in the lenses rather than by the image-converter tube itself. Both monocular- and binocular-lens systems, as well as direct and incident illumination systems, are disclosed.

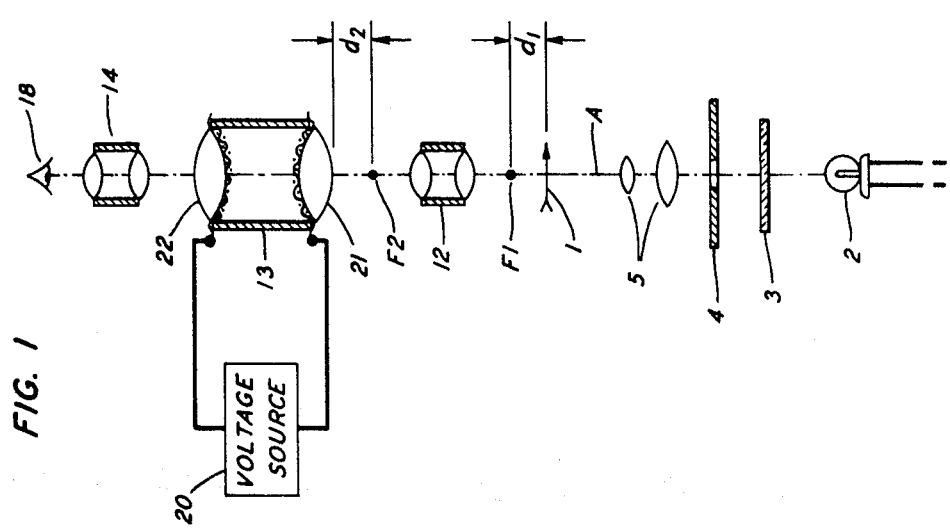

APPARATUS FOR THE PRODUCTION OF HIGH-RESOLUTION VISIBLE IMAGES OF OBJECTS ILLUMINATED BY OR EMITTING INFRARED RADIATION

BACKGROUND OF THE INVENTION

This invention relates to infrared microscopy and, more particularly, to viewing apparatus for the inspection or investigation of objects under infrared illumination, and also for the observation of infrared emission from luminescent or fluorescent objects.

There is presently a need for viewing apparatus for use in the detection and study of defects in materials which are opaque to visible light, but transparent to infrared radiation. Such materials include, by way of example, silicon and gallium arsenide which are widely used in the fabrication of semiconductor devices; and various doped garnets used in solid state lasers.

Another presently existing problem associated with the manufacture of semiconductor devices by well known photolithographic techniques involves the alignment of a photographic mask to a previously produced pattern in a semiconductor slice. It is frequently the case that the previous pattern is hidden by being buried inside the semiconductor by diffusion or ion implantation. An example of such a hidden pattern is the N$^+$-buried layer diffused into a P-type substrate to provide high-conductivity contact to an N-type substrate to provide high-conductivity contact to an N-type transistor collector epitaxially grown on the substrate. Additionally, if the previous pattern is on the opposite side of the slice from that side to which the mask is to be applied, ordinary optical techniques do not allow accurate alignment of the pattern and the mask. The present invention allows accurate alignment of photolithographic masks since the hidden patterns become visible when the semiconductor is illuminated and viewed in the infrared.

One other problem in the manufacture of semiconductor devices is the observation of patterns in semiconductor materials which are opaque to transmitted light due to the presence of a metallic layer often used to make electrical contact to one surface of the semiconductor. This invention permits observation of a particular area through the uncoated surface by illuminating with infrared radiation through the corresponding area of this surface.

In the prior art there is also a need to determine the infrared-emitting regions in such devices as GaAg lasers, and other solid state lasers and luminescent materials. This invention allows the study of such devices under high magnification, with high resolution, and also with protection of the observer's eye from exposure to the laser beam.

Furthermore, there are presently available few acceptable devices for the observation of objects which, because they are adversely affected by visible light, must be studied under infrared illumination in order that their properties be not deliteriously altered. This problem arises not only in the study of living objects and tissue, but also in the study of photographic materials and emulsions, and the investigation of processes such as photosynthesis.

Another prior art problem is the inability to readily observe moving objects and to follow their motion either in real time or by stroboscopic techniques.

It is, therefore, a broad object of the present invention to produce a visible image of an object illuminated by infrared radiation.

It is another object of this invention to produce a visible image of an object illuminated by infrared-radiation incident on either side of the object.

One other object of the present invention is to produce a visible image of defects in materials by infrared illumination thereof.

Another object of this invention is to provide for direct visible observation of infrared-radiation emission from objects such as lasers and luminescent materials.

Yet another object of this invention is to provide an optical system for aligning photolithographic masks to semiconductors, when the patterns in the semiconductor are invisible or hard to discern by prior art microscopic techniques.

Another object of the present invention is to produce a visible image of objects which, because they are adversely affected by direct visible light, are illuminated by infrared radiation.

Still another object of the present invention is to produce a magnified, visible, real image of a moving object which is illuminated with, or is itself emitting, infrared radiation.

SUMMARY OF THE INVENTION

These and other objects are accomplished in accordance with an illustrative embodiment of the invention which obtains high resolution of small objects by a unique combination of objective lenses and an image converter tube adapted so that the resolution of the system is advantageously limited by the wavelength and diffraction effects in the lenses rather than by the image converter tube itself. The system illustratively comprises a source of infrared radiation optically coupled to an object through a condenser lens. An objective lens of resolution $R$ and magnification $M$ produce an infrared image on the entrance screen of the image-converter tube having a resolution factor $s$, to be defined further hereinafter. In accordance with the invention, the objective lenses are adapted so that $M \times R > s$, thus dictating that the resolution of the system is due to the objective lenses and not the image-converter tube. The tube converts the infrared image on its entrance face to a visible image on its exit face, the latter being viewed by appropriate monocular or binocular apparatus.

This system allows an operator to observe a magnified, visible, real image of the object which is illuminated with (or is itself emitting) infrared radiation. Both direct and incident illumination can be utilized. As the object moves, or is caused to move by being mounted on a movable table or stage, its motion can be followed as it occurs. The visible image which appears on the exit screen of the image tube is magnified typically 10–20 times in a monocular or binocular magnifier and is identical in shape to the invisible (to the naked eye) infrared image which is produced on the entrance screen of the image converter tube. In addition, the system can readily be operated as a synchronous or stroboscopic viewing instrument by applying the high voltage to the tube in the form of pulses at specified intervals or periodically in the form of a pulse train.

BRIEF DESCRIPTION OF THE DRAWING

The objects of the invention, together with its various features and advantages, can be readily understood from the following more-detailed description taken in conjunction with the accompanying drawing in which:

FIG. 1 is a schematic of one illustrative embodiment of the invention utilizing a transmitted form of illumination and a monocular magnifier; and FIG. 2 is a schematic of another embodiment of the invention utilizing an incident form of illumination, a binocular magnifier and adapted for stroboscopic operation.

DETAILED DESCRIPTION

Turning now to FIG. 1, there is shown in accordance with the invention an illustrative embodiment of an infrared microscope comprising in combination, a plurality of elements aligned along a common optic axis A and adapted for viewing an object or sample 1 mounted in a convenient manner on a movable stage (not shown). These elements include a bulb, lamp or similar light source 2 which emits infrared radiation and in addition disadvantageously emits visible radiation as well. Disposed between the sample 1 and source 2, however, is a filter 3 which absorbs or reflects the visible radiation which may be harmful to the sample, but transmits the infrared radiation. This filter is illustratively made of such materials as glass, silicon, or gallium arsenide. Alternately, the lamp 2 and filter 3 can be replaced by other sources of infrared radiation such as, for example, a He-Ne laser operating at 1.15 microns or a Nd;glass or Nd;YAG laser operating at 1.06 microns provided, of course, that the operating wavelength is within the sensitive range of the image converter tube 13. The sensitivity of these tubes typically falls off rapidly for wavelengths greater than 1.2 microns. Due to the spectral purity of the laser output no filter would be required.

The infrared radiation which is transmitted by filter 3 is focused onto sample 1 by a well-known adjustable condenser lens or lenses 5. In order to improve the resolution or reduce the intensity (i.e., control the cone of illumination) of the infrared-radiation incident upon the sample 1 a diaphragm stop 4, illustratively shown to be an apertured plate, may be inserted between the filter 3 and condenser 5.

The illuminated sample 1 is then imaged by an objective lens or lenses 12 onto the photosensitive entrance screen 21 of image converter tube 13. The objective lenses are illustratively mounted in a rotating nosepiece (not shown) which allows any one of a family of lenses to be positioned over the sample. The tube 13, which has a high-voltage (e.g., 10–16 kv.) DC source 20 connected across it for continuous operation, converts the infrared image on entrance screen 21 to a visible image on its exit screen 22. The magnitude of the high voltage affects primarily only the brightness of the visible image produced. The visible image is then viewed by an observer 18 (or other visible detector) through a monocular magnifying lens 14 typically mounted in a focusing mount (not shown) so that the lens may be adjusted for various observers.

Optionally, an analyzing polarizer may be positioned between objective lens 12 and image tube 13 to allow only properly polarized light to be detected. This analyzer may be used alone when the sample emits polarized light, or in conjunction with a polarizer in position 4.

The image converter tube 13, as mentioned previously, converts the infrared image on its entrance screen 21 into a visible, but normally inverted and slightly smaller, image on its exit screen 22. Furthermore, the tube has a characteristic resolution to objects illuminated by infrared radiation; i.e., suppose alternate black and white lines of equal width are projected in the infrared onto the entrance screen. The resolution $s$ (typically 0.02 mm.) of the tube is defined as the width of the narrowest of such lines which can be resolved by the tube as separate black and white lines in the visible on its exit screen.

In the present invention the objective lenses 12 produce a magnified infrared image of the sample 1 directly on the entrance screen 21 of the image tube 13 with no intervening optically active elements. From diffraction theory it can readily be shown that the resolution of the image produced by such an objective lens depends only on the wavelength of the infrared radiation and the numerical aperture of the lens itself. While resolution does not depend directly upon the focal length of the objective lens, the magnification of the lens does. The limiting resolution for a perfectly illuminated object or sample is approximately given by:

$R = \lambda/2NA$ (1) where $\lambda$ is the wavelength of the radiation incident on the sample, and $NA$ is the numerical aperture of the objective lens.

The magnification factor $M$ of the objective lens is approximately given by:

$M = d_2/d_1$ (2) where, as shown in FIG. 1, $d_1$ is the distance to the sample 1 from the front focal point F1 of the objective lens 12 and $d_2$ is the distance to the image converter tube entrance screen 21 from the back focal point F2 of the objective lens. The distances $d_1$ and $d_2$ and the focal length $f$ of the objective lens are related by the lens formula $1/f = 1/d_1 + 1/d_2$ (3) Therefore, in terms of the known focal length of the objective and the distance $d_2$, the magnification factor M can be expressed as $M = d_2/f - 1$ (4)

The smallest dimension on the sample 1 which the objective lens 12 can resolve is R. This dimension is magnified M times when the sample is imaged on the entrance screen of the image converter tube. Thus, for an image converter tube resolution of $s$, as previously defined, and provided that, in accordance with the invention, the objective lenses are adapted such that $M \times R > s$ (5) then the resolution of the system is advantageously due to the objective and not the image tube. Because the objectives operate according to the laws of optics, the resolution of the system is the maximum allowed by these laws, and is not degraded by the image converter tube or intervening optical elements.

In a second embodiment of the invention shown schematically in FIG. 2, elements common to those of FIG. 1 have been given identical numerical designations. In this embodiment, the sample 1, objective lens 12 and image tube 13 are once again aligned along a common optic axis A. However, a type of illumination termed incident illumination is employed whereby light source 6, filter 7, diaphragms 8 and 10, and condensing lens 9 are aligned along a common optic axis B which is noncollinear with axis A.

The infrared radiation from light source 6 passes through filter 7 which removes radiation at the visible frequencies. Condensing lens 9 projects the infrared radiation by means of partially reflecting mirror 11 down through the objective lens 12 onto the sample 1. Diaphragms 8 and 10 are used to adjust the intensity of the illumination incident on the sample and also the area of the sample which is illuminated. This scheme of incident illumination, of course, may also be readily used with the transmitted illumination embodiment of FIG. 1. In fact, direct and incident illumination may be used separately or simultaneously.

A polarizer may be used in this embodiment near position 10. Because mirror 11 has highest reflectivity for polarized light whose electric field vector lies in the plane of the mirror, such a polarizer has the advantage of reducing the scattered light by first removing the polarization which would not be fully reflected by mirror 11.

The infrared image of sample 1 is then projected by objective lens 12 through partially reflecting mirror 11 onto the entrance screen 21 of image tube 13, which, as before, produces a visible image on its exit screen 22. This image is viewed by observer 18.

The mirror 11 may be a sheet of glass, or silicon or other material, made thin so that the image produced by the objective lens on the image converter tube is not distorted in passing through the mirror. Incident illumination and mirror 11 provide infrared radiation which is incident on the side of the object which is nearest the objective lens. This radiation also may penetrate the sample to allow observation of the inner details thereof even in those cases where an opaque layer, such as a metallic layer, covers the under side of the sample. The various elements of the invention may be mounted on a suitable stand which allows focusing of the objective lenses, motion of the object, adjustment of the illuminators and condensers, and rigid mounting of all the parts.

The binocular magnifier comprises a relay lens 15, a beam splitter 16, and eyepieces 17 which are typically disposed in focusable mounts (not shown). The relay lens projects the image on exit screen 22 through the beamsplitter 16 to the image planes of the eyepieces 17. The beamsplitter 16 provides a visible optical input to each of the eyepieces. Magnification in this embodiment may be varied over a wide range depending on the focal length of the relay lens, and the relative optical distances between the image tube exit screen, the relay lens and the eyepieces. Once again the foregoing binocular magnifier may also be utilized in the embodiment of FIG. 1. It should be noted that this binocular system is different from conventional binocular systems in that a real image is produced in the former and the sharpness of the focus of the binocular system is independent of the infrared focus of the objective-lens system.

Moreover, the embodiment of FIG. 2 is illustratively shown with a pulse source 23 coupled to the voltage source 20 of image converter tube 13 in order that high voltage may be applied in the form of pulses, and thus the tube may be operated in a synchronous or stroboscopic fashion. Voltage sources 20, or the combination of voltage source 20 and pulse source 23, may be connected to image tube 13 by a cable or built into the same mounting as the tube. This technique of of operation is useful, for example, where it is desired to turn on the infrared microscope a short, variable time after an injection current pulse is applied to a GaAs laser, in order to investigate the change in laser characteristics at various times after the laser is turned on. The use of synchronous or stroboscopic techniques is also equally applicable to the embodiment of FIG. 1.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, in an illustrative example, the objective lens has a focal length of 8 mm. and a numerical aperture of 0.5. For light of wavelength 1.1 micron, the resolution of the objective lens is, from equation (1), $R=1.1$ micron. The magnification $M$ which satisfies equation (5) is then to be determined. For a typical image tube $s=0.02$ mm. equation (5) yields the condition $M > 19$. In order to operate the objective lens at a magnification factor greater than 19, $d_2$ from equation (4) should be greater than 160 mm.

What is claimed is:

1. Apparatus for viewing an object illuminated by infrared radiation comprising, in combination, means having input and output faces for converting an infrared image on its input face into a visible image on its output face, said converting means having a resolution factor $s$, and objective lens means for projecting a magnified image of said object onto said input face, said lens means having magnification factor $M$ and a resolution factor $R$ equal approximately to the wavelength of said infrared radiation divided by twice the numerical aperture of said lens means, the combination of said image converting means and said objective lens means being adapted so that the product $M \times R$ is greater than $s$, thereby to limit the resolution of said apparatus by the resolution of said lens means rather than by the resolution of said image converting means.

2. The apparatus of claim 1 in combination with means for magnifying the visible image produced on said output face of said image converting means.

3. The apparatus of claim 2 wherein said magnifying means comprises monocular lens means.

4. The apparatus of claim 2 wherein said magnifying means comprises means for separating a single light beam into a pair of separate light beams, means for coupling said visible image on said output face of said image converting means to said separating means, thereby to produce a pair of said images in separate image planes, a pair of lenses having their image planes coincident with said separate image planes.

5. The apparatus of claim 4 wherein said separating means comprises a beamsplitting prism and said coupling means comprises a relay lens.

6. The apparatus of claim 2 in combination with means for controllably illuminating said object with infrared radiation comprising a source of radiation, filter means disposed between said object and said source for transmitting only infrared radiation, diaphragm means disposed between said filter means and said object to control the intensity of radiation incident upon said object, and condenser lens means disposed between said diaphragm means and said object for focusing said transmitted radiation upon said object.

7. The apparatus of claim 6 wherein said illuminating means and said object, objective lens means, and image converting means lie along the same optic axis.

8. The apparatus of claim 7 in combination with an analyzing polarizer positioned between said objective lens means and said image converting means.

9. The apparatus of claim 8 in combination with a second polarizer positioned between said source of radiation and said object.

10. The apparatus of claim 7 wherein said illuminating means and the group comprising said object, objective lens, and image converting means lie along intersecting noncollinear optic axes, and wherein said illuminating means further includes means for partially reflecting and partially transmitting infrared radiation, said latter means being disposed at the intersection of said optic axes for reflecting said transmitted infrared radiation through said objective lens to incidence on said object, and second diaphragm means disposed between said condenser lens and said partially reflecting and partially transmitting means.

11. The apparatus of claim 10 wherein said partially reflecting-partially transmitting means comprises a planar mirror and in combination with a polarizer positioned between said mirror and said source of radiation so that radiation incident upon said mirror is polarized primarily in the plane of said mirror.

12. The apparatus of claim 6 wherein said image converting means comprises an image-converter tube.

13. The apparatus of claim 12 for synchronous or stroboscopic operation in combination with means for turning on and off said tube at controlled, specified intervals.

14. The apparatus of claim 13 wherein said tube includes a high voltage source for operation thereof and said means for turning on and off said tube comprises a pulse source coupled to said high voltage source so that said high voltage is applied to said tube only during said specified intervals.

* * * * *